United States Patent
Ohta

[19]

[11] Patent Number: 5,890,393
[45] Date of Patent: Apr. 6, 1999

[54] ELECTRIC LOCK ACTUATOR

[75] Inventor: Satoshi Ohta, Shizuoka-ken, Japan

[73] Assignee: Asmo Co., Ltd., Shizuoka-ken, Japan

[21] Appl. No.: 759,169

[22] Filed: Dec. 3, 1996

[30] Foreign Application Priority Data

Dec. 6, 1995 [JP] Japan .................................. 7-318322

[51] Int. Cl.$^6$ .................................................. F16H 25/14
[52] U.S. Cl. ..................................... 74/411; 74/424.8 VA; 464/57
[58] Field of Search ........................... 74/411, 424.8 VA; 464/57, 160; 70/190, 275, 277, 280

[56] References Cited

U.S. PATENT DOCUMENTS

| | | | |
|---|---|---|---|
| 2,616,274 | 11/1952 | Landrum | 464/57 |
| 2,936,625 | 5/1960 | Heiseler | 464/57 |
| 4,518,181 | 5/1985 | Yamada | 292/201 |
| 4,669,283 | 6/1987 | Ingenhoven | 70/264 |
| 4,723,454 | 2/1988 | Periou et al. | 74/89.15 |
| 4,941,694 | 7/1990 | Bartel et al. | 292/201 |
| 4,978,155 | 12/1990 | Kobayashi | 292/336.3 |
| 5,389,040 | 2/1995 | Kakimi | 464/57 |
| 5,526,710 | 6/1996 | Ohta | 74/89 |

FOREIGN PATENT DOCUMENTS

| | | |
|---|---|---|
| 2-16436 | 4/1990 | Japan . |
| 2-81880 | 6/1990 | Japan . |
| 2-81881 | 6/1990 | Japan . |
| 3-25590 | 4/1991 | Japan . |
| 4-131557 | 5/1992 | Japan . |
| 4-362362 | 12/1992 | Japan . |
| 7-10316 | 2/1995 | Japan . |
| 07076963A | 3/1995 | Japan . |
| 2 218 729 | 11/1989 | United Kingdom . |

*Primary Examiner*—Charles A. Marmor
*Assistant Examiner*—David Fenstermacher
*Attorney, Agent, or Firm*—Nawrocki, Rooney & Sivertson, P.A.

[57] ABSTRACT

An electric actuator reciprocates an output shaft driven by an electric motor in a linear manner. The actuator has a main body case. A rotating body supported by the case includes a pin rotating body, a gear wheel, and a coil spring. The gear wheel is meshed with a pinion that is fixed to the drive shaft of the electric motor. The rotation of the gear wheel is transmitted to the pin rotating body by the coil spring. The pin rotating body includes a rotary shaft. The rotary shaft has a pair of guide pins provided on its outer surface. A cylindrical cam is fixed to the output shaft, which is supported by the case. The cylindrical cam includes a spiral guided portion defined on its inner surface. The guided portion slides against both guide pins of the rotary shaft. The drive force of the electric motor rotates the rotary shaft by means of the gear wheel and the coil spring. As the rotary shaft is rotated, the output shaft is reciprocated along the rotary shaft with the guided portion guided by both guide pins.

10 Claims, 12 Drawing Sheets

Fig.2
Fig.3
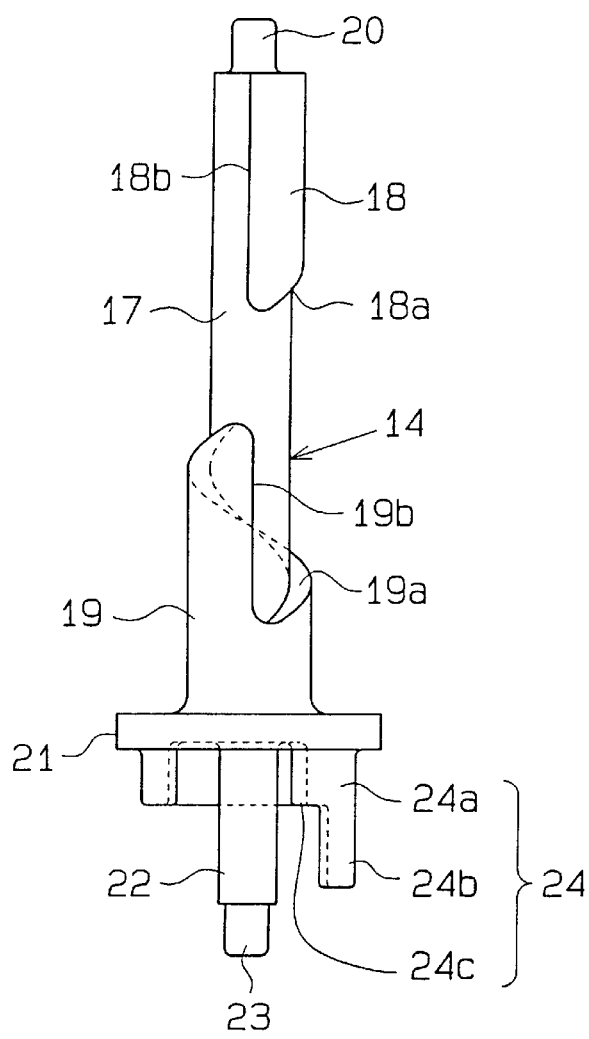
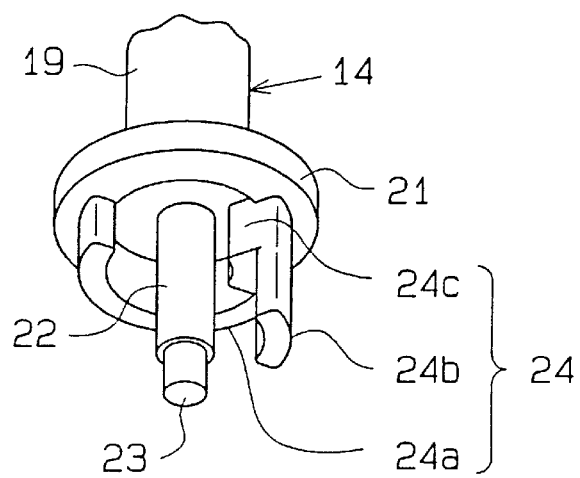

ELECTRIC LOCK ACTUATOR

BACKGROUND OF THE INVENTION

1. Field of the Invention

The present invention relates to electric actuators having an electric motor and an output shaft driven by the motor. More particularly, the present invention relates to an electric actuator which reciprocates an output shaft in a linear manner.

2. Description of the Related Art

Typically, automobile doors are provided with opening mechanisms. Each opening mechanism includes a door lock striker, a latch, and a door handle. When the door is closed, the striker engages the latch and holds the door in a closed state. When the door is in a closed state, manipulation of the handle releases the engagement between the striker and the latch. This enables the opening of the door.

The opening mechanism further includes a locking apparatus. The locking apparatus has an actuating lever, and a lock lever, which is connected to the lever by a coupling mechanism. The lock lever is selectively shifted between a lock position and an unlock position. The actuation lever cooperates with the lock lever and shifts between a lock position and an unlock position. The shifting of the lock lever to the lock position arranges the actuation lever at the lock position and causes the locking apparatus to become operative. This prohibits the releasing of the engagement between the striker and the latch. As a result, the engagement between the striker and the latch is not released even when the door handle is manipulated. In other words, the door is held in a locked state and is prohibited from being opened. Shifting the lock lever to the unlock position arranges the actuation lever at the unlock position and causes the locking apparatus to become inoperative. This allows releasing of the engagement between the striker and the latch. As a result, the engagement between the striker and the latch is released when the door handle is manipulated. In other words, the door is held in an unlocked state in which it may be opened.

Each locking mechanism further includes an electric actuator. Each electric actuator selectively shifts the actuation lever of the locking apparatus between a lock position and an unlock position. There is an existing type of electric actuator that is provided with an electric motor, an output shaft, and a gear mechanism connecting to the motor and the output shaft. Actuation of the motor causes linear reciprocation of the output shaft by means of the gear mechanism. When a lock control switch provided near the driver's seat is turned on, the motor is rotated in a forward direction so as to move the output shaft to the front. The frontward movement shifts the actuation lever to the lock position. When the lock switch is turned off, the rotation of the motor is reversed so as to move the output shaft to the rear. The rearward movement shifts the actuation lever to the unlock position. Accordingly, the output shaft of the electric actuator moves reciprocally in accordance with the movement of the lock lever. Reciprocation of the output shaft of the electric actuator shifts the lock lever between the lock position and the unlock position.

Japanese Unexamined Patent Publication No. 7-76963 discloses an example of an electric actuator proposed by the assignee of this application. The electric actuator includes an electric motor and a driven gear, which is driven by the motor. The driven gear is provided with an integral rotary shaft that extends along the axis of the gear. A pair of guide pins project from the outer cylindrical surface of the rotary shaft. A cylindrical output shaft is supported by the rotary shaft. The output shaft moves in the axial direction with respect to the rotary shaft without rotating with respect to the rotary shaft. The output shaft has a guided member that projects from its inner cylindrical surface. The guided member is strip-like and includes a cam surface defined thereon. The guided member slides along each guide pin. The output shaft and the rotary shaft constitute an inverse cam mechanism. Rotation of the rotary shaft slides and moves the guide pins along the cam surface of the guided member. Since it is required for the output shaft to reciprocate along the rotary shaft in a linear manner, the rotary shaft and the output shaft are long.

Abutting surfaces of the guide pins abut against the restricting surface of the guided member when the output shaft is moved to its stroke end position. This restricts the rotation of the rotary shaft and the driven gear. Impact is produced when the rotation of the electric motor is restricted. For each time the rotation of the electric motor is restricted, a relatively large stress is produced at the basal portion of the rotary shaft, or the coupling portion between the rotary shaft and the driven gear. Thus, the rotary shaft must have strength that is sufficient to endure the stress. To satisfy this requirement, it is necessary to either form the rotary shaft from a material having high strength or to enlarge the shaft.

Japanese Unexamined Utility Model Publication Nos. 2-81880 and 2-81881 discloses another type of electric actuator. This electric actuator includes a drive gear (worm gear) provided on the drive shaft of the electric motor, a driven gear (worm wheel), a pinion, and an inclining arm. The driven gear and the pinion are coaxial. The drive gear and driven gear are meshed with each other. The driven gear rotates the pinion. The inclining arm inclines about a pivot pin. A sector gear is provided at the basal portion of the arm. The sector gear and pinion are meshed with each other. Actuation of the electric motor rotates the pinion by means of the drive gear and the driven gear. The rotation of the pinion moves the sector gear and inclines the inclining arm. When this electric actuator is employed in the locking mechanism, the actuation lever of the locking apparatus is selectively shifted between the lock position and the unlock position in accordance with the inclining of the arm.

The above actuator also produces impact when the rotation of the electric motor is restricted as the movement of the inclining arm becomes restricted. Accordingly, stress may be produced between the sector gear and the pinion. Therefore, this electric actuator has a mechanism to absorb the stress produced between the sector gear and the pinion. The absorbing mechanism includes a spring arranged between the driven gear and the pinion. The rotating force of the driven gear is transmitted to the pinion through the spring. Accordingly, when impact is produced as the rotation of the electric motor is restricted, the impact is absorbed by the spring between the driven gear and the pinion. As a result, the stress produced between the sector gear and the pinion is absorbed.

However, the latter electric actuator, which is provided with the absorbing mechanism, differs from the former electric actuator. Accordingly, the former electric actuator type, which reciprocates the output shaft with the rotary shaft provided on the driven gear, does not include a mechanism to absorb the stress produced in the rotary shaft.

SUMMARY OF THE INVENTION

Accordingly, it is a main objective of the present invention to provide an electric actuator, in which rotation of the rotary shaft is converted to linear reciprocation of the output shaft, capable of absorbing an impact applied to the rotary shaft when the rotary shaft is stopped.

To achieve the above objective, the present invention provides an improved electric actuator. The electric actuator includes an electric motor having a drive shaft, a rotating body rotated in forward and reverse directions by the drive shaft of the electric motor, an output shaft for reciprocating linearly along its axial direction, and a cam mechanism arranged between the rotating body and the output shaft for converting rotation movement of the rotating body to linear movement of the output shaft. The cam mechanism includes a restricting portion for restricting rotation of the rotating body when the output shaft is moved to a predetermined position. An impact absorbing member absorbs the impact of transmission of a drive force of the drive shaft sent to the rotating body when the rotation of the rotating body is restricted by the restricting portion.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is a front view showing a pin rotating body;

FIG. 3 is a perspective view showing a portion of the pin rotating body;

DETAILED DESCRIPTION OF THE INVENTION

First Embodiment

A first embodiment according to the present invention will hereafter be described with reference to FIGS. 1 through 19. In this embodiment, an electric actuator according to the present invention is applied to a locking apparatus provided in a door opening mechanism. In the following description, the upper, lower, left, right, front, and rear directions are based on the viewed of FIG. 1. The references to clockwise and counterclockwise directions are based on a view from above in FIG. 1.

Figure 1:
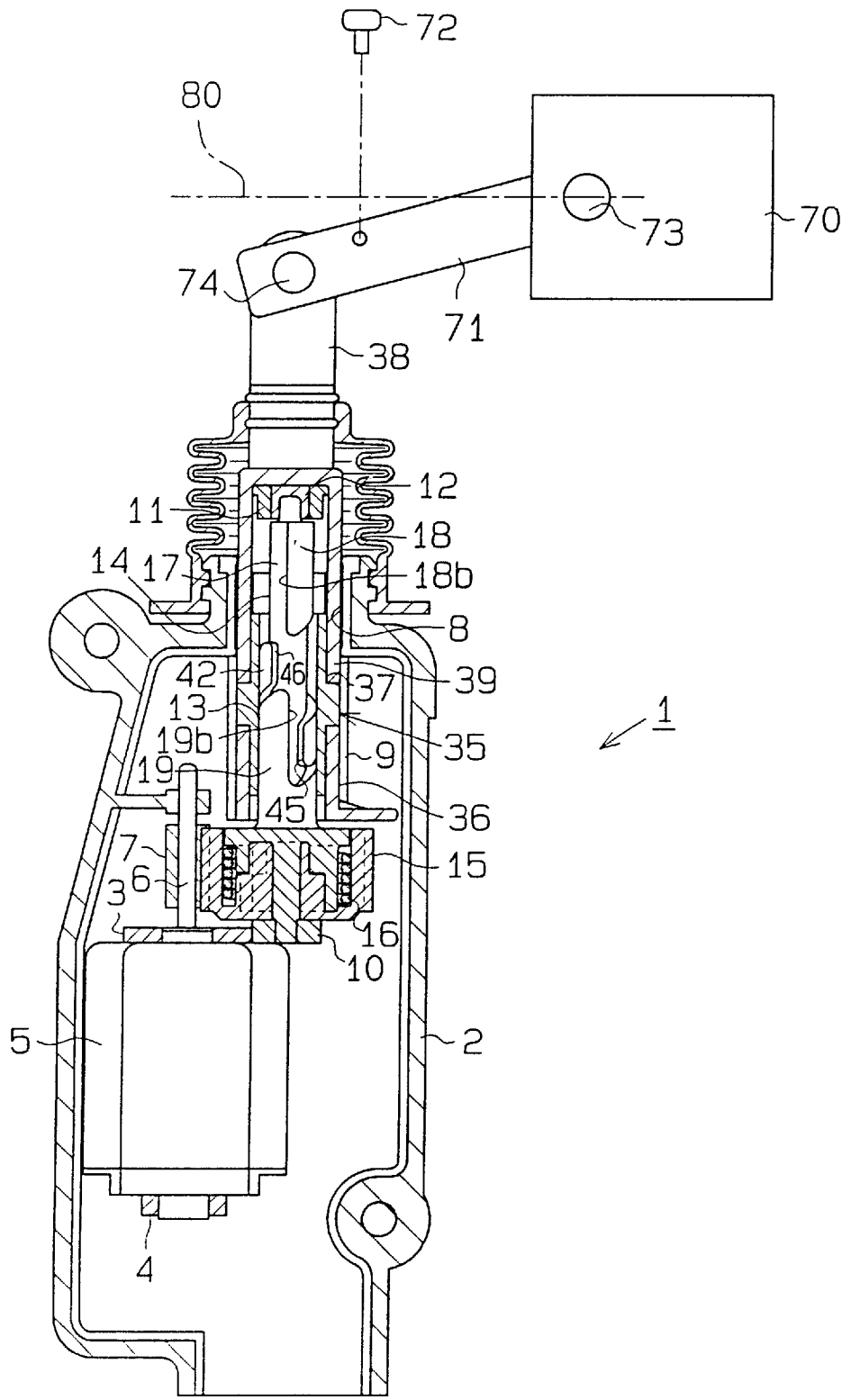
FIG. 1 is a front view partially in cross section showing a first embodiment of an electric actuator.

As shown in FIG. 1, the electric actuator 1 is coupled to an actuation lever 71 of a locking apparatus 70. The locking apparatus 70 is provided in an opening mechanism of an automobile door (not shown). The opening mechanism includes a door lock striker, a latch, and a door handle (all not shown). When the door is closed, the striker engages the latch and holds the door in a closed state. When the door is closed, manipulation of the handle releases the engagement between the striker and the latch. This enables the opening of the door.

Figure 10:
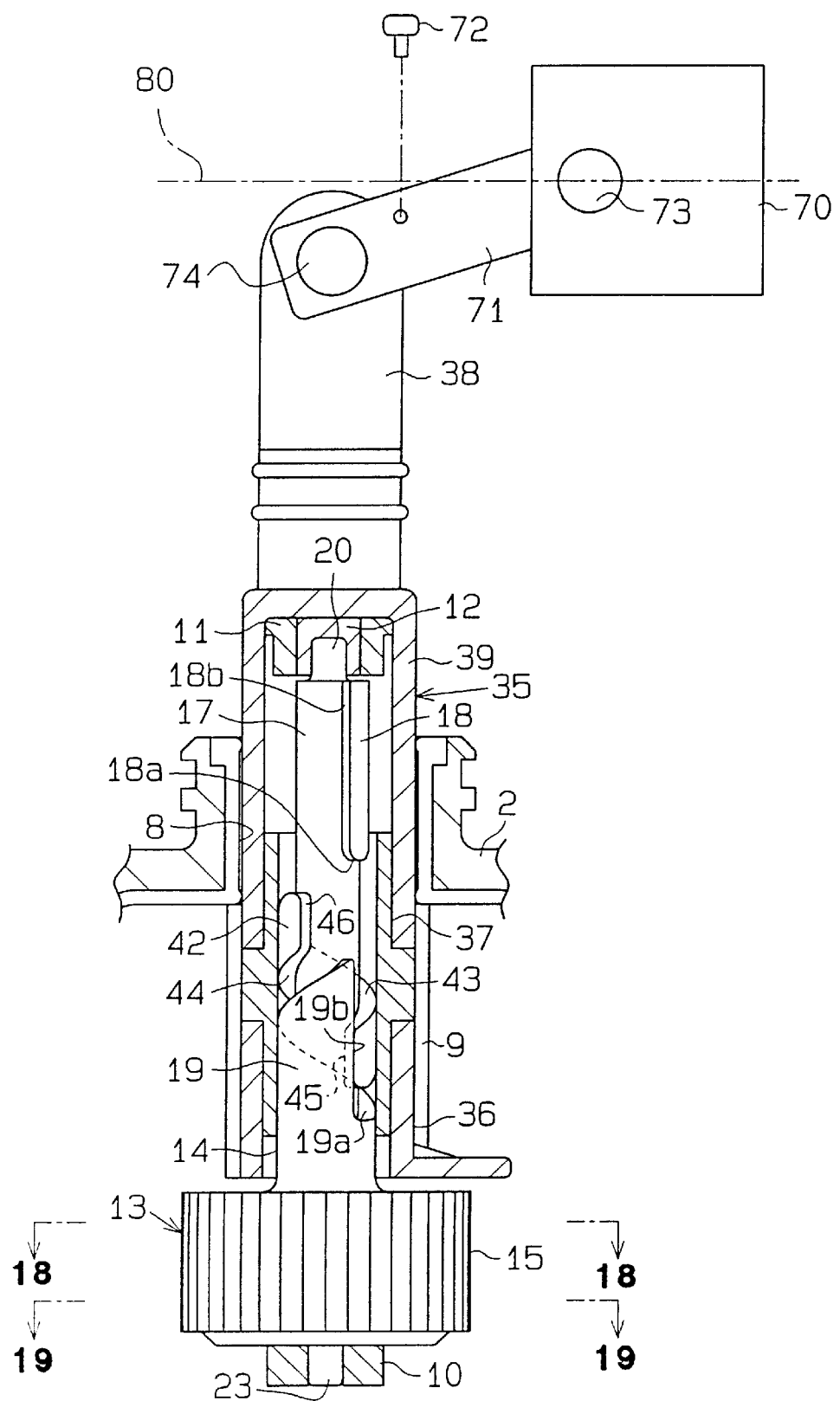
FIG. 10 is a front view partially in cross section showing the rotating body and the output shaft of FIG. 1.
Figure 12:
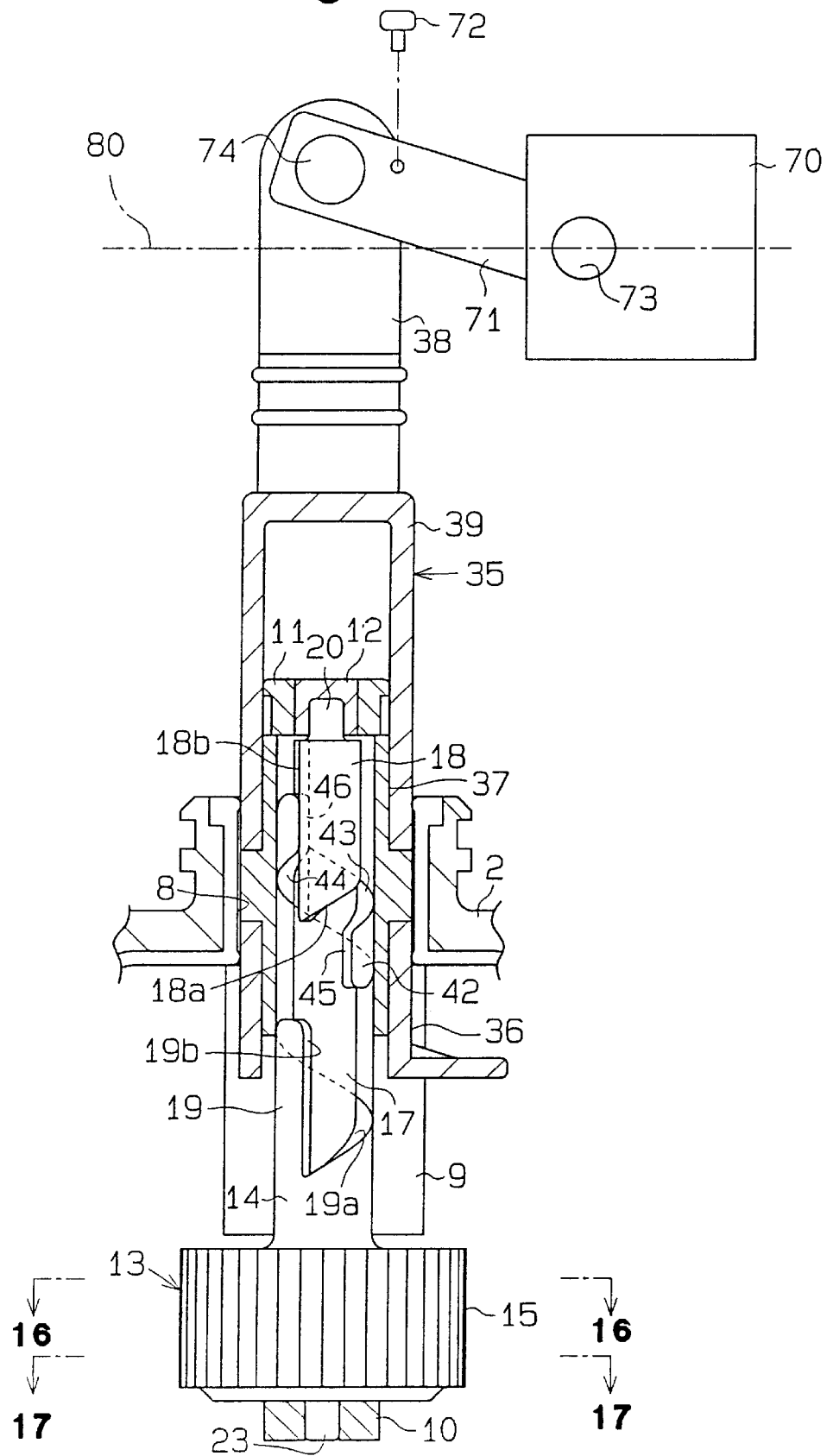
FIG. 12 is the view of FIG. 11 with the output shaft in a different position.

In addition to the actuation lever 71, the locking apparatus 70 has a lock knob 72 that is coupled to the lever 71 by means of a rod (not shown). The lock knob 72 is selectively manipulated between a lock position and an unlock position. The actuation lever 71 pivots about a support shaft 73. The actuation lever 71 cooperates with the manipulation of the lock knob 72 and is shifted between a lock position, at which it is inclined as shown in FIGS. 1 and 10, and an unlock position, at which it is oppositely inclined as shown in FIG. 12. Manipulation of the lock knob 72 to the lock position arranges the actuation lever 71 at the lock position so that the locking apparatus 70 becomes operative. This prohibits the releasing of the engagement between the striker and the latch. As a result, the door is prohibited from opening and remains in a locked state regardless of manipulation of the door handle. Manipulation of the lock knob 72 to the unlock position arranges the actuation lever 71 at the unlock position so that the locking apparatus becomes inoperative. This allows the engagement between the striker and the latch to be released. Therefore, the door is held in an unlocked state that allows opening when the door handle is manipulated.

The locking apparatus 70 includes an urging mechanism (not shown) incorporated therein. The urging mechanism selectively urges the actuation lever 71 to the lock position and the unlock position. That is, the urging mechanism urges and forcibly pivots the actuation lever 71 to the unlock position when the actuation lever 71 is pivoted upward beyond a horizontal line 80. The urging mechanism urges and forcibly pivots the actuation lever 71 to the unlock position when the actuation lever 71 is pivoted downward beyond the horizontal line 80.

The electric actuator 1 is provided with a main body case 2. A pair of holders 3, 4 are provided inside the case 2. An electric motor 5 is supported between the holders 3, 4. A drive shaft 6 of the electric motor 5 extends in the vertical direction. A pinion 7 is fixed to the drive shaft 6.

The case 2 has an opening 8 defined at its upper portion. A pair of guide walls 9 (only one shown in FIG. 1), which are provided in the case 2, extend downward along the inner wall of the opening 8. A bearing 10 is provided under the guide walls 9. A position restricting member 11 is arranged above the opening 8. A bearing 12 provided in the restricting member 11 corresponds to the bearing 10. A rotating body 13 is rotatably supported between the bearings 10, 12.

The rotating body 13 includes a pin rotating body 14, a gear wheel 15, and a torsion coil spring 16. As shown in FIG. 2, the pin rotating body 14 has a rotary shaft 17. The rotary shaft 17 has a guide pin 18 projecting from the upper side of its outer cylindrical surface and a guide pin 19 projecting from the lower side of its outer cylindrical surface.

The upper guide pin 18 has a sliding surface 18a defined on its lower surface. The sliding surface 18a is defined about the rotary shaft 17 extending upward and spirally in a counterclockwise direction. The guide pin 18 is provided with an engaging surface 18b that faces the clockwise direction with respect to the rotary shaft 17. The lower guide pin 19 has a sliding surface 19a defined on its upper surface. The sliding surface 19a is defined about the rotary shaft 17 extending upward and spirally in a counterclockwise direction. The guide pin 19 is provided with an engaging surface 19b that faces the counterclockwise direction with respect to the rotary shaft 17. The engaging surface 18b of the guide pin 18 and the engaging surface 19b of the guide pin 19 are arranged on the rotary shaft 17 at positions overlapping each other. A shaft portion 20 projecting from the upper end of the rotary shaft 17 is supported by the bearing 12.

A round base plate 21 is provided at the lower side of the rotary shaft 17. The base plate 21 has a support shaft 22 projecting downward from the bottom center of the base plate 21. A journal 23 defined at the distal end of the support shaft 22 is supported by the bearing 10. As shown in FIG. 3, an engaging piece 24 is provided on the bottom surface of the base plate 21. The engaging piece 24 curves along an arc extending about the support shaft 22. The engaging piece 24 includes an upper engaging portion 24a and a lower engaging portion 24b. The upper engaging portion 24a extends along substantially half of the periphery of the base plate 21. The lower engaging portion 24b is formed in correspondence with the clockwise end of the upper engaging portion 24a with respect to the support shaft 22. A restricting portion 24c projecting from the inner side of the upper engaging portion 24a extends along the same angular range as the lower engaging portion 24b.

Figure 6:
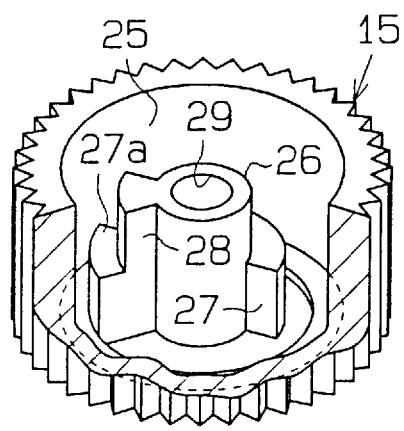
FIG. 6 is a partially cut away perspective view of FIG. 1 showing the gear wheel.

As shown in FIG. 6, an accommodating portion 25 is defined at the inner side of the gear wheel 15. The gear wheel 15 has a bearing 26, which projects from the center of the accommodating portion 25. A lower engaging portion 27 and an upper engaging portion 28 extend along the outer surface of the bearing 26. The lower engaging portion 27 extends along substantially the same angular range as the upper engaging portion 24a of the base plate 21. The upper engaging portion 28 is formed in correspondence with the counterclockwise end of the lower engaging portion 27, which extends about the bearing 26. A restricting portion 27a projecting outward from the lower engaging portion 27 extends along the same angular range as the upper engaging portion 28. The support shaft 22 is inserted into a bearing hole 29, which is defined in the bearing 26. The gear wheel 15 and the pinion 7 are meshed with each other.

Figure 7:
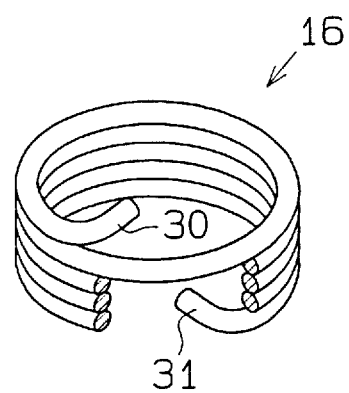
FIG. 7 is a partially cut away perspective view showing the torsion coil spring of FIG. 1.

As shown in FIG. 7, the coil spring 16 has an upper engaging end 30 and a lower engaging end 31. It is relatively easy to set the initial load and the spring constant in this type of coil spring 16.

Figure 8:
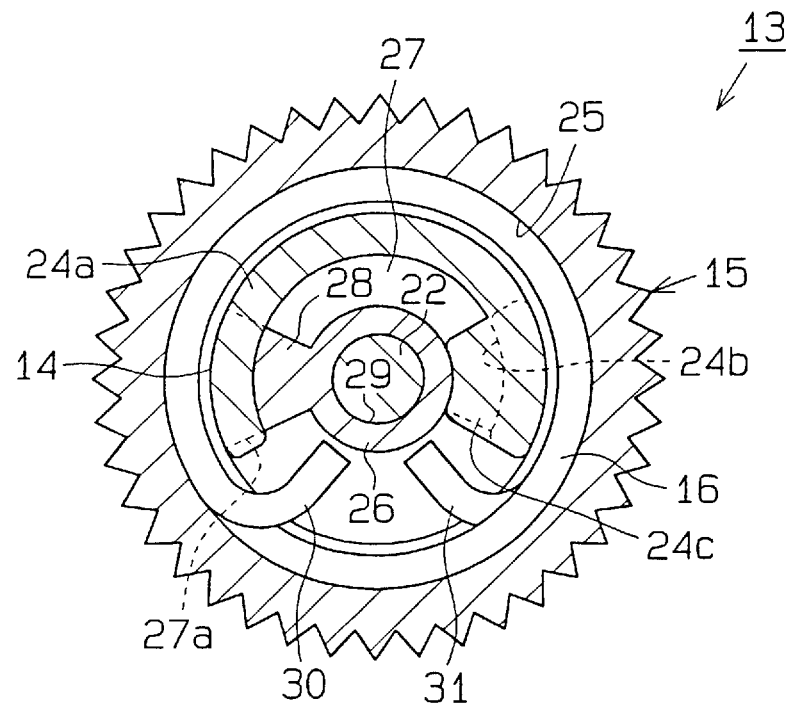
FIG. 8 is a cross-sectional plan view showing the rotating body (gear wheel) of FIG. 1.
Figure 9:
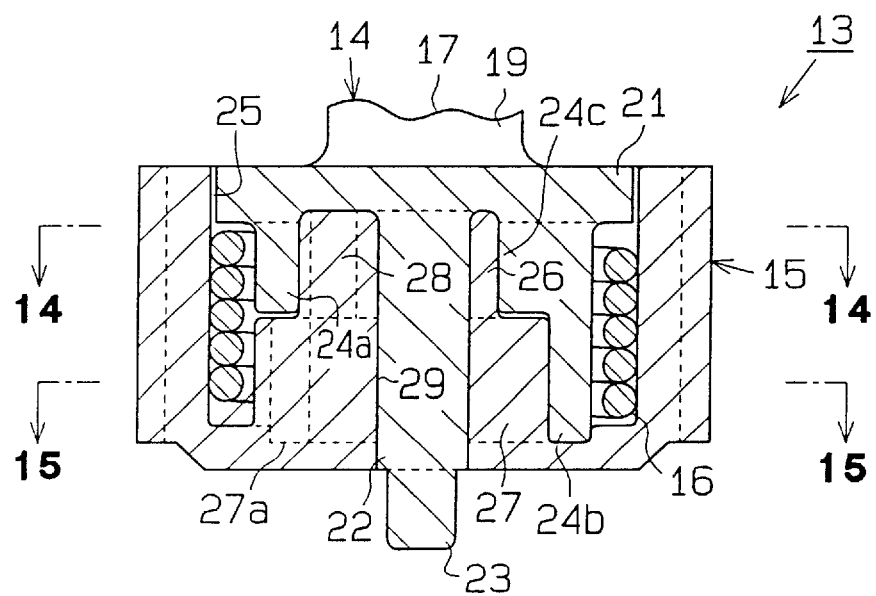
FIG. 9 is a vertical cross-sectional view showing a portion of the rotating body (gear wheel)

As shown in FIG. 8 and FIG. 9, the support shaft 22 of the pin rotating body 14 is inserted into the bearing hole 29 of the gear wheel 15 in the rotating body 13. The coil spring 16 is accommodated in the accommodating portion 25 and arranged about the outer surface of the engaging piece 24 of the pin rotating body 14.

When the gear wheel 15 is rotated in the clockwise direction with respect to the pin rotating body 14, the end of the engaging portion 27 of the gear wheel 15 engages the engaging end 31 of the coil spring 16. The gear wheel 15 is further rotated in the clockwise direction together with the coil spring 16 to engage the engaging end 30 of the coil spring 16 with the engaging portion 24a of the pin rotating body 14. This transmits the clockwise rotation of the gear wheel 15 to the pin rotating body 14 by means of the coil spring 16. In this state, restriction of the rotation of the pin rotating body 14 enables relative rotation of the gear wheel 15 with respect to the pin rotating body 14. The rotation deforms and brings the engaging ends 30, 31 of the coil spring 16 toward each other. Further rotation of the gear wheel 15 in the clockwise direction causes its restricting portion 27a to abut against the engaging portion 24b of the pin rotating body 14.

When the gear wheel 15 is rotated in the counterclockwise direction with respect to the pin rotating body 14, the end of the upper engaging portion 28 of the gear wheel 15 engages the engaging end 30 of the coil spring 16. The gear wheel 15 is further pivoted in the counterclockwise direction together with the coil spring 16 to engage the engaging end 31 of the coil spring 16 with the engaging portion 24b of the pin rotating body 14. This transmits the counterclockwise rotation of the gear wheel 15 to the pin rotating body 14 by means of the coil spring 16. In this state, restriction of the rotation of the pin rotating body 14 enables relative rotation of the gear wheel 15 with respect to the pin rotating body 14. The rotation deforms and approaches the engaging ends 30, 31 of the coil spring 16 toward each other. Further rotation of the gear wheel 15 in the counterclockwise direction causes its upper engaging portion 28 to abut against the restricting portion 24c of the pin rotating body 14.

Figure 5:
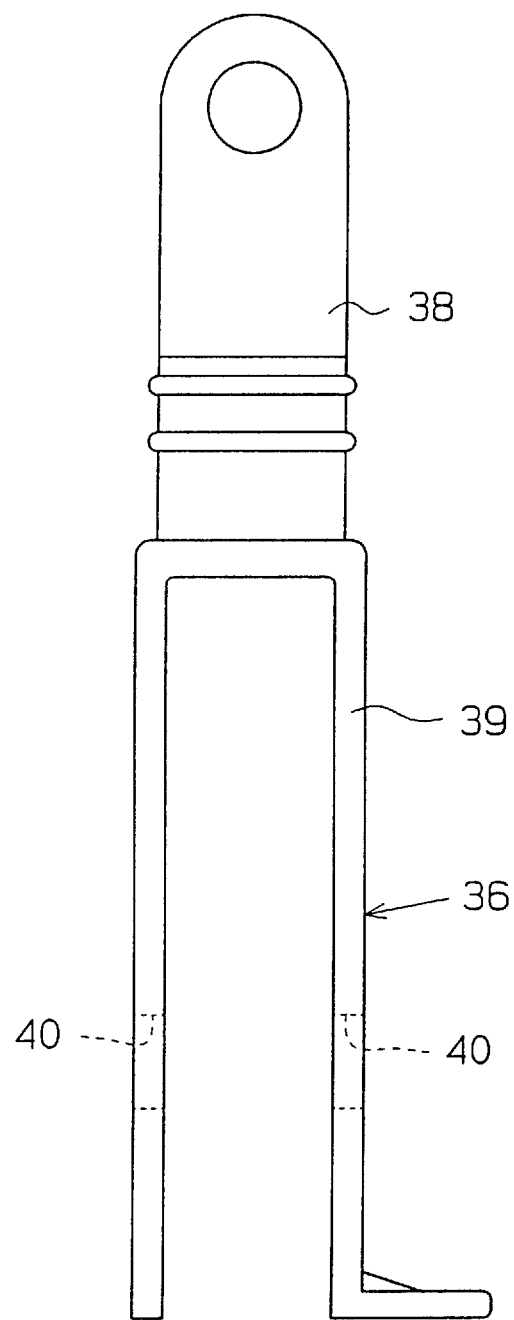
FIG. 5 is a front view showing an output shaft.

As shown in FIG. 1, a movable body 35 is retained between the guide walls 9. The movable body 35 is movable in the vertical direction in the opening 8 along the guide walls 9. Rotation of the movable body 35 about its axis is prohibited. The movable body 35 includes an output shaft 36 and a cylindrical cam 37. As shown in FIG. 5, the output shaft 36 has an actuating rod 38 and a holding portion 39. The actuating rod 38 is connected to the actuation lever 71 by means of a support shaft 34. The holding portion 39 is formed having a reversed U-shape and holds the cylindrical cam 37. The holding portion 39 has engaging holes 40 defined on both of its sides to engage the cylindrical cam 37.

Figure 4:
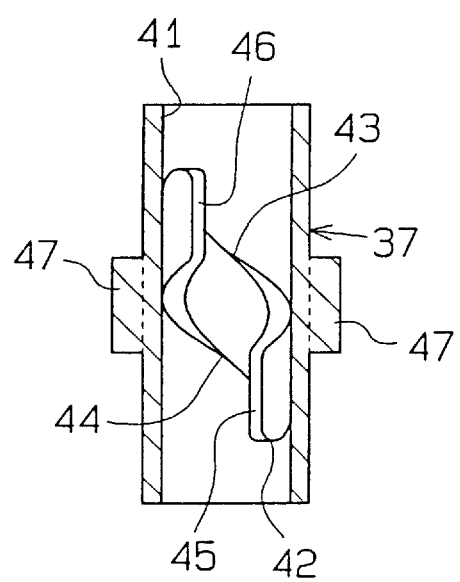
FIG. 4 is a front view partially in cross section showing a cylindrical cam.

As shown in FIG. 4, the cylindrical cam 37 has an insertion hole 41. The insertion hole 41 includes spiral guided portions 42 that are defined on its inner surface. The guided portion 42 is strip-like and extends spirally for an angular range that is less than the whole circumference of the inner wall of the insertion hole 42. A guide surface 43 is defined on the upper surface 43 of the guided portion 42. The guide surface 43 extends upward in a counterclockwise direction about the axis of the cylindrical cam 37. The guided portion 42 has another guide surface 44 defined on its lower surface. The guide surface 44 extends upward in a counterclockwise direction about the axis of cam 37. The guided portion 42 has a restricting surface 45 defined on its clockwise side end surface. The guided portion 42 has another restricting surface 46 defined on its counterclockwise side end surface. The restricting surfaces 45, 46 are spaced from each other for a predetermined angular interval. The cylindrical cam 37 has a pair of engaging plates 47 that projects outward from its peripheral surface. The engagement of the engaging plates 47 with the engaging holes 40 of the holding portion 39 enables the cylindrical cam 37 to be integral with the output shaft 36. The above-described restricting member 11 is arranged in the upper part of the holding portion 39.

The downward movement of the movable body 35 is restricted by the abutment between the upper section of the inner wall of the holding portion 39 and the restricting member 11 (the position restricting the downward movement will hereafter be referred to as "bottom position"). When the movable body 35 is located at the bottom position, the actuation lever 71 is arranged at the lock position. Contrarily, the upward movement of the movable body 35 is restricted by the abutment between the upper surface of the cylindrical cam 37 and the lower surface of the restricting member 11 (the position restricting the upward movement will hereafter be referred to as "top position"). When the movable body 35 is located at the top position, the actuation lever 71 is arranged at the unlock position. In other words, the movable body 35 is movable for a predetermined distance between the bottom and top positions (the distance will hereafter be referred to as "moving stroke").

The rotary shaft 17 of the pin rotating body 14 is inserted through the insertion hole 41 of the cylindrical cam 37. The guide surface 43 of the guided portion 42 is slidable with respect to the sliding surface 18a of the upper guide pin 18. The guide surface 44 of the guided surface 42 is slidable with respect to the sliding surface 19a of the lower guide pin 19.

When the pin rotating body 14 rotates in the clockwise direction as the sliding surface 19a of the guide pin 19 slides along the guide surface 44, the cylindrical cam 37 moves upward along the pin rotating body 14. During this movement, the engaging surface 19b of the lower guide pin 19 is separated from the restricting surface 45 of the guided portion 42 and moves in the clockwise direction. This abuts the engaging surface 18b of the upper guide pin 18 against the restricting surface 46 of the guided portion 42 and restricts the clockwise rotation of the pin rotating body 14.

Contrarily, the pin rotating body 14 rotates in the counterclockwise direction with the sliding surface 18a of the guide pin 18 sliding along the guide surface 43. This moves the cylindrical cam 37 downward along the pin rotating body 14. During this movement, the engaging surface 18b of the upper guide pin 19 is separated from the restricting surface 46 of the guided portion 42 and moves in the counterclockwise direction. This abuts the engaging surface 19b of the lower guide pin 19 against the restricting surface 45 of the guided portion 42 and restricts the counterclockwise rotation of the pin rotating body 14.

A predetermined gap is defined between the sliding surface 18a of the upper guide pin 18 and the sliding surface 19a of the lower guide pin 19. The size of the gap is greater than the distance obtained by adding the moving stroke of the movable body 35 to the vertical width of the guided portion 42. Accordingly, the cylindrical cam 37 moves along the cam rotating body 14 for a stroke that is longer than its moving stroke with the engaging surfaces 18b, 19b of the guide pins 18, 19 arranged between the restricting surfaces 45, 46 of the guided portion 42.

When the movable body 35 is arranged at the bottom position, the engaging surface 19b of the lower guide pin 19 abuts against the restricting surface 45 of the guided portion 42. During the abutment, clockwise rotation of the pin rotating body 14 for a predetermined angle causes the sliding surface 19a of the lower guide pin 19 to come into contact with the guide surface 44 of the guided portion 42. During the contact, the engaging surface 18b of the upper guide pin 18 passes by the restricting surface 46 of the guided surface 42 and is positioned above the guide surface 43.

Contrarily, when the movable body 35 is arranged at the top position, the engaging surface 18b of the upper guide pin 18 abuts against the restricting surface 46 of the guided portion 42. During the abutment, counterclockwise rotation of the pin rotating body 14 for a predetermined angle causes the sliding surface 18a of the upper guide pin 18 to come into contact with the guide surface 43 of the guided portion 42. During the contact, the engaging surface 19b of the upper guide pin 19 passes by the restricting surface 45 of the guided surface 42 and is positioned below the guide surface 44.

The operation of the electric actuator having the above structure will now be described. FIG. 10 shows the movable body 35 located at the bottom position with the actuation lever 71 of the locking apparatus 70 arranged at the lock position. In this state, the actuation lever 71 of the locking apparatus 70 urges the movable body 35 to the bottom position. The locking apparatus 70 becomes operative, and the door is locked, in which state the opening of the door is prohibited.

From this state, the manipulation of the lock knob 72 pivots the actuation lever 71 upwards. This moves the guided portion 42 without interference with the upper guide pin 18. Hence, the actuation lever 71 is switched to the unlock position and the lock knob 72 is arranged at the unlock position. As a result, the locking apparatus 70 becomes inoperative, in which state the opening of the door is allowed.

Figure 14:
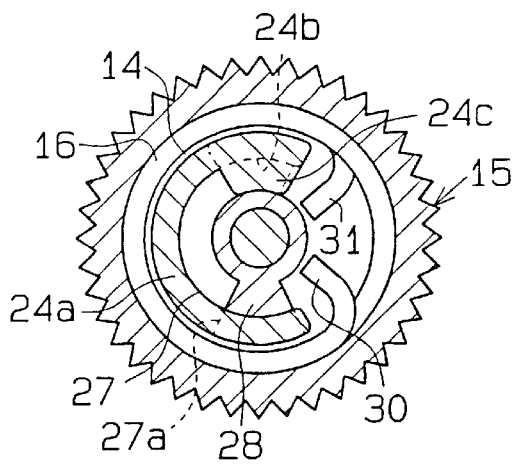
FIG 14 is a cross-sectional view taken along line 14—14 in FIG. 9.
Figure 15:
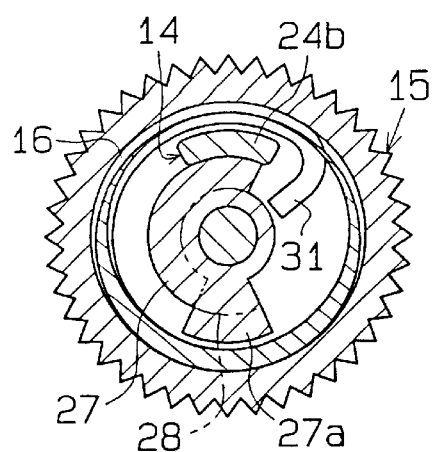
FIG. 15 is a cross-sectional view taken along line 15—15 in FIG. 9.

In the state shown in FIG. 10, if the electric motor 5 is not actuated and a clockwise drive force is not applied to the gear wheel 15, the engaging portions 27, 28 of the gear wheel 15 and the engaging piece 24 of the pin rotating body 14 are arranged at the positions shown in FIGS. 14, 15 by the engaging ends 30, 31 of the coil spring 16.

From the above state, the electric motor 5 is driven to rotate the gear wheel 15 clockwise. During the rotation, the lower engaging portion 27 of the gear wheel 15 engages with the lower engaging end 31 of the coil spring 16 and rotates the coil spring 16 clockwise. Hence, the upper engaging end 30 of the coil spring 16 engages with the upper engaging portion 24a of the pin rotating body 14 and rotates the pin rotating body 14 clockwise together with the gear wheel 15.

Figure 11:
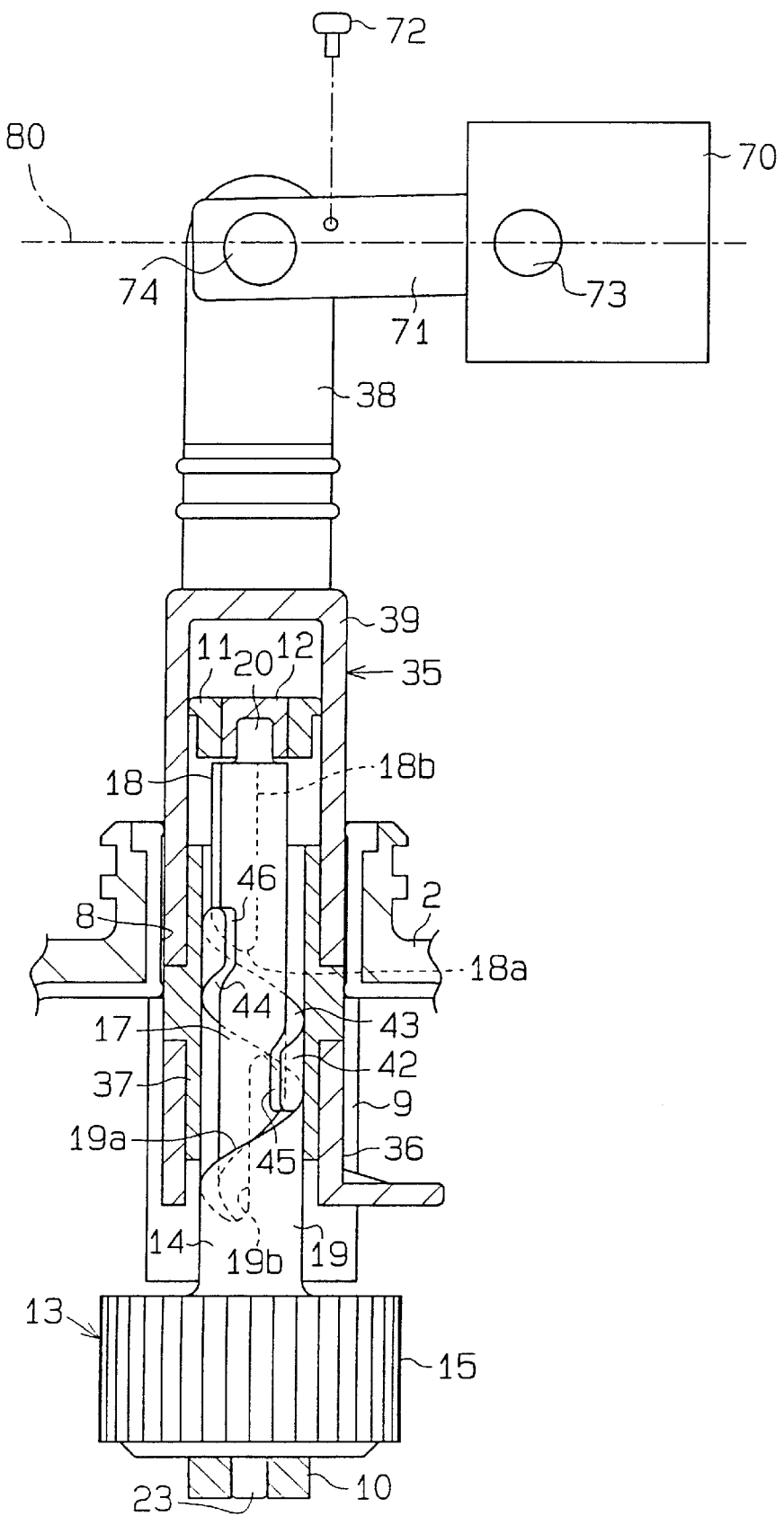
FIG. 11 is the view of FIG. 10 with the output shaft in a different position.

From the state shown in FIG. 10, in which the engaging surface 19b of the lower guide pin 19 abuts against the restricting surface 45 of the guided portion 42, rotation of the pin rotating body 14 for a predetermined angle causes the sliding surface 19a of the lower guide pin 19 to slide with respect to the guide surface 44 of the guided portion 42. As a result, as shown in FIG. 11, the rotation of the pin rotating body 14 moves the movable body 35 upwards. Since the movable body 35 is urged downward by the actuation lever 71, the guide surface 44 of the guided portion 42 constantly slides on the sliding surface 19a of the lower guide pin 19. As the engaging surface 19b of the lower guide pin 19 moves to a position below the restricting surface 45 of the guided portion 42, the movable body 35 pivots the actuation lever 71 to a position above the horizontal line 80. Hence, the actuation lever 71 is pivoted to the unlock position by the urging mechanism of the locking apparatus 70. Accordingly, the movable body 35 is arranged at the top position by the actuation lever 71 and the guided portion 42 is located at the upper side separated from the lower guide pin 19. This causes the locking apparatus 70 to become inoperative, in which state the opening of the door is allowed.

Figure 16:
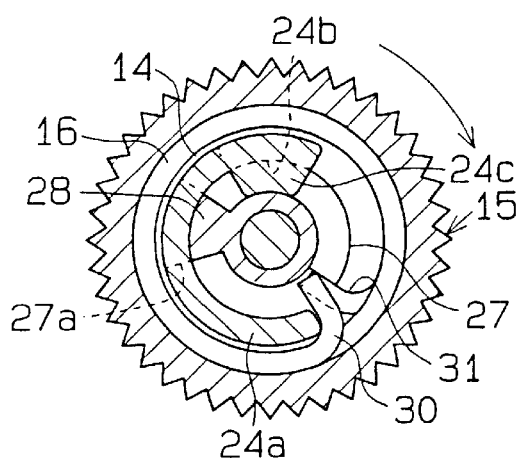
FIG. 16 is a cross-sectional view taken along line 16—16 in FIG. 12.
Figure 17:
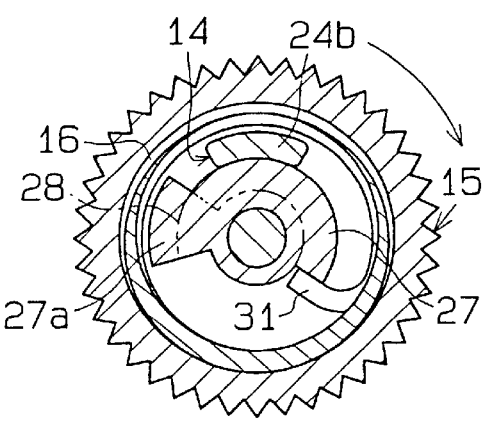
FIG. 17 is a cross-sectional view taken along line 17—17 in FIG. 12.

When the movable body 35 is located at the top position, the electric motor 5 further rotates the gear wheel 15 clockwise. As shown in FIG. 12, this causes the engaging surface 18b of the upper guide pin 18 to abut against the restricting surface 46 of the guided portion 42 and thus restrict the rotation of the pin rotating body 14. The electric motor 5 further continues to rotate the pin rotating body 14 clockwise. Thus, as shown in FIGS. 16, 17, the engaging end 30 of the coil spring 16 engages with the engaging piece 24a of the stopped pin rotating body 14. In this state, the lower engaging portion 27 moves the engaging end 31 clockwise against the reaction force of the coil spring 16. Accordingly, the impact of the stopping of the pin rotating body 14 that causes the stopping of the electric motor 5 is absorbed by the coil spring 16. As a result, the impact produced when stopping the electric motor 5 is not applied to the pin rotating body 14. Furthermore, when the gear wheel 15 is rotated clockwise against the reaction force of the coil spring 16, the engaging portion 27a abuts against the engaging portion 24b and restricts further rotation of the gear wheel 15.

From the above state, manipulation of the lock knob 72 pivots the actuation lever 71 downward. This moves the guided portion 42 downward without interference with the lower guide pin 19. Hence, the actuation lever 71 is switched to the lock position. As a result, the locking apparatus 70 becomes operative, in which state the opening of the door is prohibited.

Contrarily, as shown in FIG. 12, when the movable body 35 is arranged at the top position, or held at the top position by the actuation lever 71, the electric motor 5 is actuated and the gear wheel 15 is rotated counterclockwise. This causes the upper engaging portion 28 of the gear wheel 15 to engage the engaging end 30 of the coil spring 16 and rotate the coil spring 16 counterclockwise. Hence, the engaging end 31 of the coil spring 16 engages with the lower engaging portion 24b of the pin rotating body 14. As a result, the pin rotating body 14 rotates counterclockwise together with the gear wheel 15.

Figure 13:
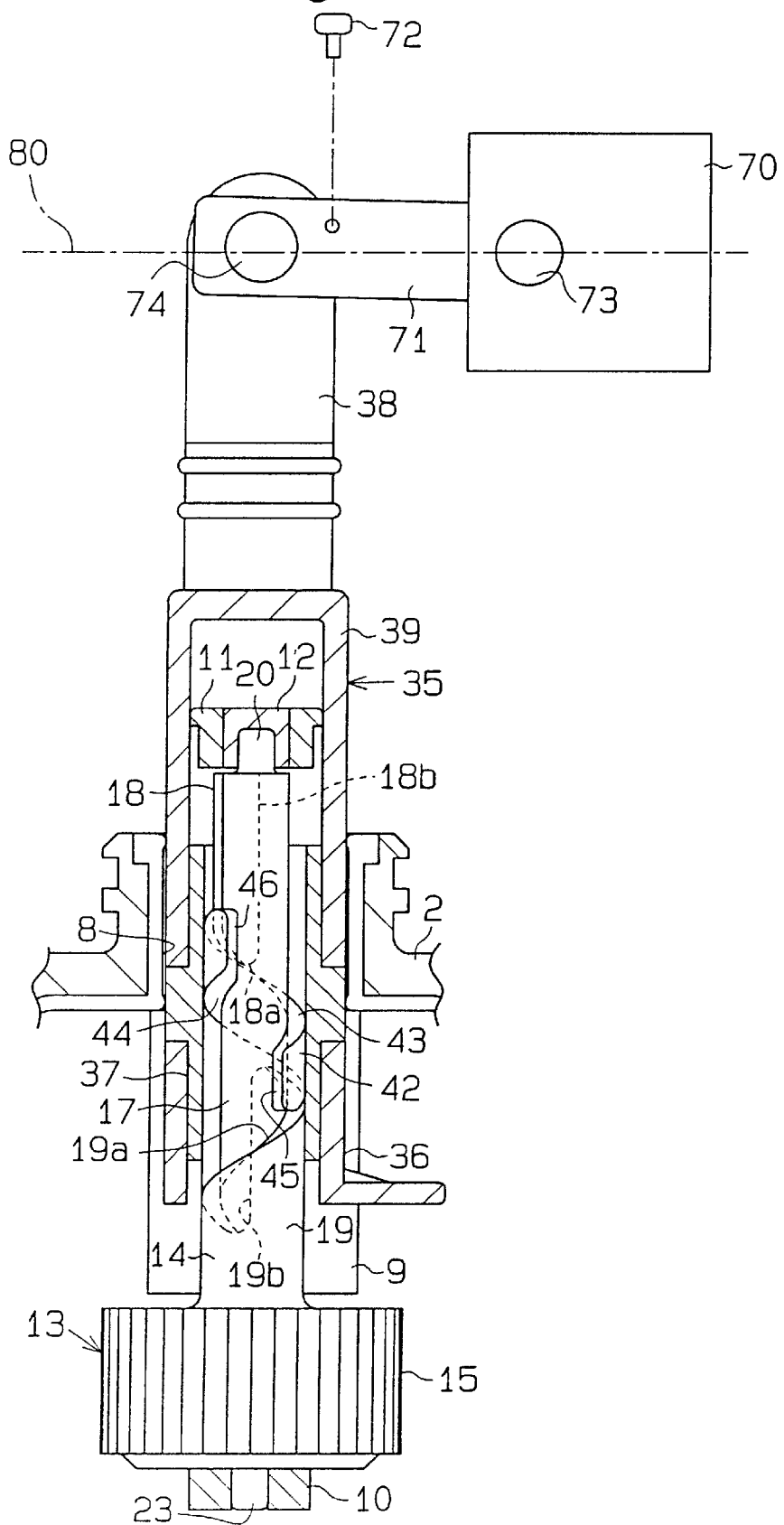
FIG. 13 is the view of FIG. 12 with the output shaft in a different position.

When the pin rotating body 14 rotates counterclockwise for a predetermined angle, the sliding surface 18a of the upper guide pin 18 slides along the guide surface 43 of the guided portion 42. Thus, as shown in FIG. 13, the movable body 35 moves downward as the pin rotating body 14 is rotated. During the movement, the movable body 35 is urged upward by the actuation lever 71. As a result, the guide surface 43 of the guided portion 42 slides constantly along the slide surface 18a of the upper guide pin 18. As the engaging surface 18b of the upper guide pin 18 moves to a position above the restricting surface 46 of the guided portion 42, the movable body 35 pivots the actuation lever 71 to a position below the horizontal line 80. Hence, the actuation lever 71 is pivoted to the lock position by the urging mechanism of the locking apparatus 70. As a result, the locking apparatus 70 becomes operative and the door becomes unlocked, in which state the opening of the door is prohibited. Accordingly, the movable body 35 is arranged at the bottom position by the actuation lever 71 and the guided portion 42 is moved away from the upper guide pin 18 in a downward direction.

Figure 18:
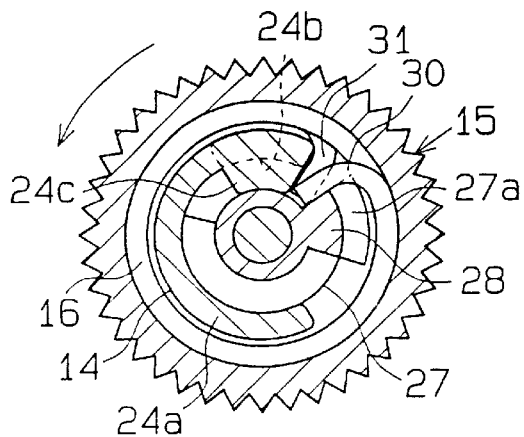
FIG. 18 is a cross-sectional view taken along line 18—18 in FIG. 10.
Figure 19:
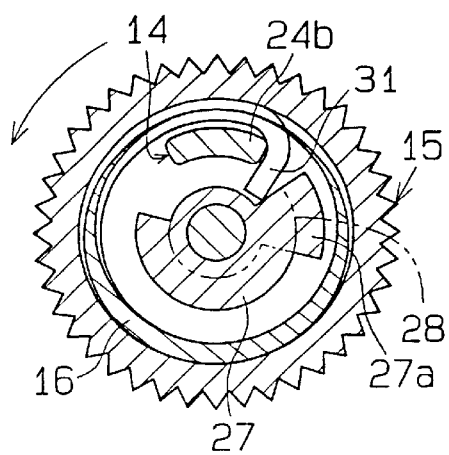
FIG. 19 is a cross-sectional view taken along line 19—19 in FIG. 10.

From the above state, the electric motor 5 further rotates the gear wheel 15 counterclockwise. The rotation of the pin rotating body 14 is restricted since the engaging surface 19b of the lower guide pin 19 abuts against the restricting surface 19b of the guided portion 42. The electric motor 5 further rotates the gear wheel 15 counterclockwise. Thus, as shown in FIG. 18, 19, the engaging end 31 of the coil spring 16 engages the lower engaging portion 24b of the stopped pin rotating body 14. In this state, the upper engaging portion 28 moves the engaging end 30 counterclockwise against the reaction force of the coil spring 16. As a result, the impact produced when stopping the electric motor 5 is not applied to the pin rotating body 14. The gear wheel 15 is further rotated counterclockwise against the reaction force of the coil spring 16. This causes the upper engaging portion 28, which is engaged with the engaging end 30, to abut against the restricting portion 24c. This causes restriction of further rotation of the gear wheel 15.

As described above, the electric actuator 1 of the present embodiment enables the following effects to be obtained.

The rotation of the gear wheel 15 produced by the electric motor 5 is transmitted to the pin rotating body 14 by means of the coil spring 16. Thus, when the rotation of the pin rotating body 14 is stopped, the impact produced by the stopping of the electric motor 5 is absorbed by the coil spring 16. As a result, the impact produced when stopping the electric motor 5 is not applied to the pin rotating body 14. Accordingly, a large level of stress is not applied to the basal portion of the rotary shaft 17 when the engaging surface 18b of the pin rotating body 14, which is separated from the gear wheel 15, hits the restricting surface 46 of the guided portion 42. As a result, the durability of the rotary shaft 17 of the pin rotating body 14 is enhanced regardless of the shaft 17 being long. Furthermore, the high durability enables the material of the rotary shaft 17 to have low strength and be inexpensive. The diameter of the rotary shaft 17 may also be decreased to minimize the size of the electric actuator 1. Furthermore, knocking sounds that are produced when actuating the electric actuator 1 are prevented. Thus, the electric actuator 1 is quiet when actuated.

Since the coil spring 16 is accommodated in the gear wheel 15, space for the coil spring 16 need not be provided. Therefore, this structure prevents enlargement of the electric actuator 1 due to the additional coil spring 16.

Impact that is produced when stopping the pin rotating body 14 is absorbed by the coil spring 16, the initial load and spring constant of which may easily be set. Thus, by optimally setting the initial load and the spring constant, impact corresponding to the drive force of the electric motor 5 may appropriately be absorbed without causing delays in the responsiveness of the pin rotating body 14 with respect to the rotation of the electric motor 5.

Second Embodiment

A second embodiment according to the present invention will hereafter be described with reference to FIG. 20 to FIG. 26. This embodiment differs from the first embodiment in that the engaging piece 24 of the pin rotating body 14 is replaced by an engaging piece 50 and that the shape of the bearing 26 of the gear wheel 15 is altered. Accordingly, parts that are identical to those used in the first embodiment are denoted with the same numerals and will not be described below. Differing parts will be described.

Figure 20:
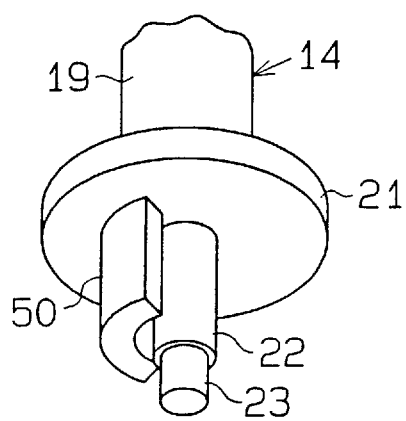
FIG. 20 is a partial perspective view showing a pin rotating body of an electric actuator according to a second embodiment.
Figure 21:
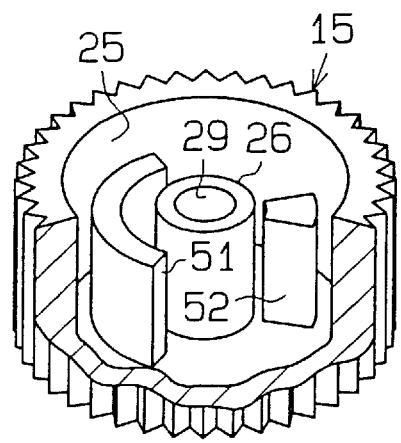
FIG. 21 is a partially cut away perspective view showing a gear wheel according to the second embodiment.

As shown in FIG. 20, the engaging piece 50, which is one of the characteristics of this embodiment, projects from the base plate 21 of the pin rotating body 14 about the support shaft 22. The engaging piece 50 is curved along an arc, the center of which corresponds to the support shaft 22. As shown in FIG. 21, the bearing 26 provided in the accommodating portion 25 of the gear wheel 15 is cylindrical and has a bearing hole 29. In the accommodating portion 25, a first engaging portion 51 and a second engaging portion 52 project about the bearing 26. The first engaging portion 51 is curved along an arc, the center of which corresponds to the bearing 26. The engaging portion 51 extends along the same angular range as the engaging piece 50. The second engaging portion 52 is arranged on the opposite side of the bearing 26 with respect to the first engaging portion 51.

Figure 22:
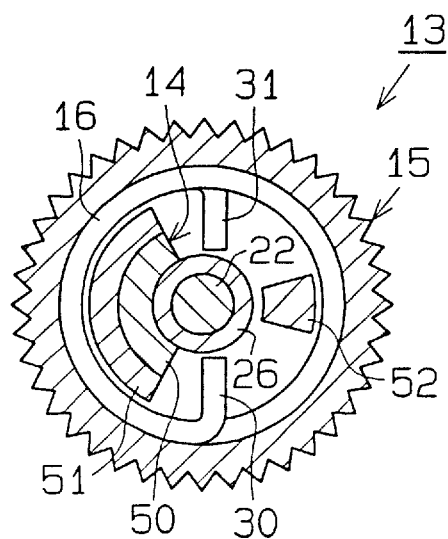
FIG. 22 is a cross-sectional plan view showing a rotating body (gear wheel) of FIG. 21.
Figure 23:
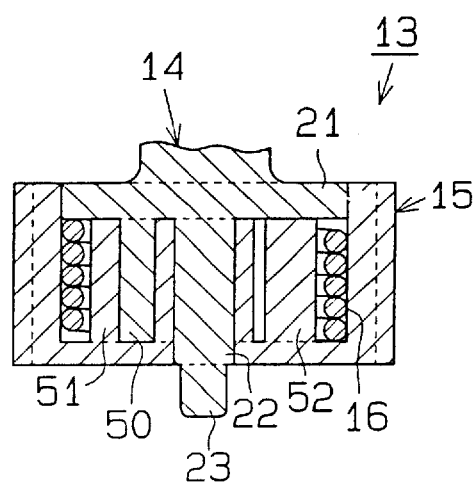
FIG. 23 is a vertical cross-sectional view showing a portion of the rotating body (gear wheel) of FIG. 22.

As shown in FIGS. 22, 23, the engaging piece 50 is arranged between the first engaging portion 51 and the bearing 26. The coil spring 16 is arranged in the accommodating portion 25 about the first and second engaging portions 51, 52. The engaging end 30 of the coil spring 16 may be engaged with the end of the first engaging portion 51 or the end of the engaging piece 50. The engaging end 31 of the coil spring 16 may be engaged with the end of the first engaging portion 51 or the end of the engaging piece 50.

When the gear wheel 15 is rotated clockwise with respect to the pin rotating body 14, the first engaging portion 51 of the gear wheel 15 engages the engaging end 31 of the coil spring 16. During the engagement, the rotation of the gear wheel 15 rotates the coil spring 16 clockwise and engages the engaging end 30 of the coil spring 16 with the engaging piece 50 of the pin rotating body 14. Therefore, the clockwise rotation of the gear wheel 15 is transmitted to the pin rotating body 14 through the coil spring 16. In this state, due to the restriction of the rotation of the pin rotating body 14, the rotation of the gear wheel 15 deforms and brings the engaging ends 31, 30 toward each other. Furthermore, the clockwise rotation of the gear wheel 15 abuts the second engaging portion 52 against the engaging piece 50, which is engaged with the engaging end 30.

Contrarily, when the gear wheel 15 is rotated counterclockwise with respect to the pin rotating body 14, the first engaging portion 51 of the gear wheel 15 engages the engaging end 30 of the coil spring 16. During the engagement, the rotation of the gear wheel 15 causes the coil spring 16 to rotate counterclockwise and engages the engaging end 31 of the coil spring 16 with the engaging piece 50 of the pin rotating body 14. Therefore, the counterclockwise rotation of the gear wheel 15 is transmitted to the pin rotating body 14 through the coil spring 16. In this state, due to the restriction of the rotation of the pin rotating body 14, the rotation of the gear wheel 15 deforms and brings the engaging ends 30, 31 toward each other. Furthermore, the counterclockwise rotation of the gear wheel 15 abuts the second engaging portion 52 against the first engaging portion 51, which is engaged with the engaging end 31.

Figure 24:
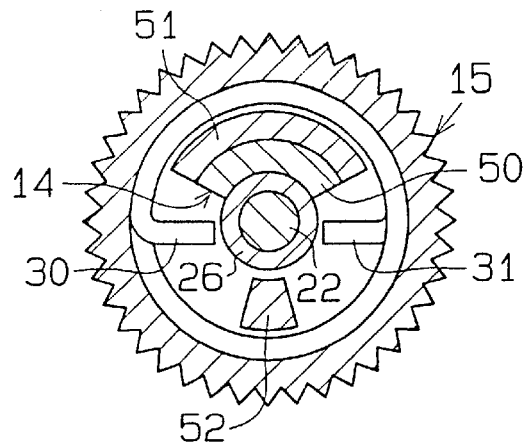
FIG. 24 is a cross-sectional plan view showing the rotating body (gear wheel) of FIG. 22.

The operation of the electric actuator having the above structure will now be described. If the electric motor 5 is not actuated and a counterclockwise drive force is not applied to the gear wheel 15, the first engaging portion 51 of the gear wheel 15 and the engaging piece 50 of the pin rotating body 14 are arranged at overlapping positions, as shown in FIG. 24, by the engaging ends 30, 31 of the coil spring 16. From this state, the electric motor 5 rotates the gear wheel 15 clockwise and engages the first engaging portion 51 of the gear wheel 15 engages with the engaging end 31 of the coil spring 16. This rotates the coil spring 16 clockwise. Hence, the engaging end 30 of the coil spring 16 engages the engaging piece 50 of the pin rotating body 14 and rotates the pin rotating body 14 clockwise together with the gear wheel 15.

Figure 25:
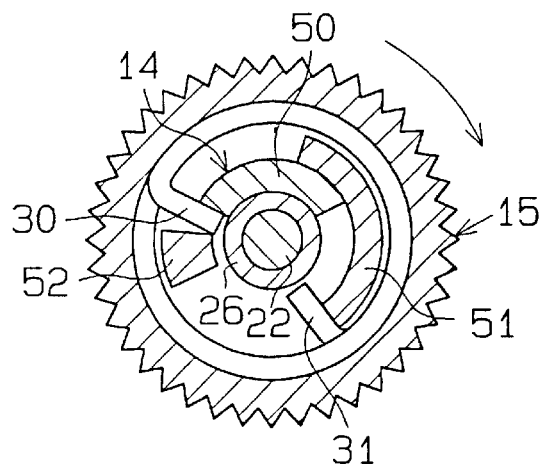
FIG. 25 is a cross-sectional plan view also showing the rotating body (gear wheel) of FIG. 22.

When the clockwise rotation of the pin rotating body 14 is restricted, the electric motor 5 rotates the gear wheel 15 clockwise. Thus, as shown in FIG. 25, the engaging end 30 of the coil spring 16 engages with the engaging piece 50 of the stopped pin rotating body 14. In this state, the first engaging portion 51 moves the engaging end 31 clockwise against the reaction force of the coil spring 16. Accordingly, the stopping of the pin rotating body 14 that causes the impact produced when stopping the electric motor 5 to be absorbed by the coil spring 16. As a result, the impact produced when stopping the electric motor 5 is not applied to the pin rotating body 14. The gear wheel 15 is further rotated clockwise against the reaction force of the coil spring 16. This abuts the second engaging portion 52 against the first engaging portion 51, which is engaged with the engaging end 30. Thus, further rotation of the gear wheel 15 is restricted.

Figure 26:
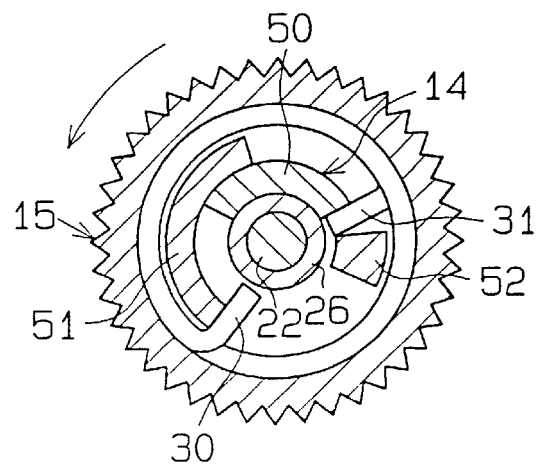
FIG. 26 is a cross-sectional view also showing the rotating body (gear wheel) of FIG. 22.

Contrarily, when the counterclockwise rotation of the pin rotating body 14 is restricted, the electric motor 5 rotates the gear wheel 15 counterclockwise. Thus, as shown in FIG. 26, the engaging end 31 of the coil spring 16 engages with the engaging piece 50 of the stopped pin rotating body 14. In this state, the first engaging portion 51 moves the engaging end 30 counterclockwise against the reaction force of the coil spring 16. Accordingly, the stopping of the pin rotating body 14 that causes the impact produced when stopping the electric motor 5 is absorbed by the coil spring 16. As a result, the impact produced when stopping the electric motor 5 is not applied to the pin rotating body 14. The gear wheel 15 is further rotated counterclockwise against the reaction force of the coil spring 16. This abuts the second engaging portion 52 against the first engaging portion 51, which is engaged with the engaging end 31. Thus, further rotation of the gear wheel 15 is restricted.

As described above, the effects of the electric actuator according to this embodiment is the same as that of the first embodiment.

The present invention is not limited to the above embodiments and may be embodied in other forms, such as those described below, without departing from the spirit of the invention.

In the above embodiments, the coil spring 16 is accommodated in the accommodating portion 25 of the gear wheel 15. However, the absorbing member, which includes the coil spring 16, may be provided at the outer side of the gear wheel 15. For example, the coil spring 16 may be arranged on the base plate 21. One of the engaging ends of the coil spring 16 is arranged so as to engage the inner side of the coil spring 16 with an engaging piece provided on the pin rotating body 14. The other engaging end of the coil spring 16 is arranged so as to engage the outer side of the coil spring 16 with an engaging portion provided on the gear wheel 15.

In the above embodiments, a single electric motor 5 for rotating the drive shaft 6 was employed. However, an electric motor incorporating reduction gears may also be employed to rotate the pin rotating body 14. In this case, absorbing means such as a coil spring is provided between the drive shaft of the electric motor and the pin rotating body 14.

In the above embodiments, the rotation of the gear wheel 15 is transmitted to the pin rotating body 14 by means of the coil spring 16, which is provided between the gear wheel 15 and the pin rotating body 14. However, the rotation of the gear wheel 15 may be transmitted to the pin rotating body 14 by spring mechanisms such as a plate spring, a coil spring, a spiral spring, and a rod spring. Furthermore, elastomeric material such as rubber or a sponge may be used in lieu of the spring.

The electric actuator may include constituents such as a rotary shaft having a guided portion on its outer surface, and a movable body having a pair of guide pins that slide on the guided portion. This structure prevents the impact produced when stopping the electric motor from being transmitted to the rotary shaft.

A cylindrical portion, which is fit into the gear wheel, and a pair of guide pins, which is arranged on the inner cylindrical surface of the cylindrical portion, may be provided. A pillar-like movable body is fit into the cylindrical portion. A guided portion that slides with respect to the guide pins may be provided on the outer surface of the movable body. The structure of the electric actuator may be altered in this manner.

In the same manner, a cylindrical portion, which is fit into the gear wheel, and a guided portion, which is arranged on the inner cylindrical surface of the cylindrical portion, may be provided. A pillar-like movable body is fit into the cylindrical portion. A guide pin that slides with respect to the guided portion may be provided on the outer surface of the movable body. The structure of the electric actuator may be altered in this manner.

In each of the above structures, impact produced when stopping the electric motor is prevented from being transmitted to the cylindrical portion by providing absorbing means such as a coil spring between the gear wheel and the cylindrical portion.

In each of the above embodiments, the pinion 7 and the gear wheel 15 are constituted by spur gears. However, the pinion 7 may be a worm and the gear wheel 15 may be a worm gear.

In each of the above embodiments, a pair of frictional wheels may be employed in lieu of the pinion 7 and the gear wheel 15. In this case, the sliding between the frictional wheels absorbs impact produced when stopping the rotation of the pin rotating body 14.

In each of the above embodiments, the electric actuator is employed in the locking apparatus 70 of the door opening mechanism of an automobile. However, the electric actuator may be employed in a locking apparatus of a door opening mechanism for vehicles other than automobiles or for a locking apparatus of a door opening mechanism used in buildings.

What is claimed is:

1. An electric lock actuator comprising:

an electric motor having a drive shaft;

a rotating body rotated in forward and reverse directions by said drive shaft of said electric motor;

an output shaft for reciprocating linearly along its axial direction;

a cam mechanism arranged between said rotating body and said output shaft for converting rotational movement of the rotating body to linear movement of the output shaft;

a restricting portion included in the cam mechanism for restricting rotation of said rotating body when said output shaft is moved to a predetermined position;

an impact absorbing means provided between said drive shaft of said electric motor, said impact absorbing means serving to absorb an impact of transmission of a drive force of said drive shaft sent to said rotating body when the rotation of the rotating body is restricted by said restricting portion; and wherein said rotating body includes a rotary shaft and a gear wheel that are arranged coaxially, said rotary shaft and said gear wheel being capable of relative rotation;

said electric motor includes a pinion fixed to said drive shaft, said pinion being meshed with said gear wheel; and said impact absorbing means is arranged between said gear wheel and said rotary shaft in the gear wheel, said drive shaft of said electric motor being constructed and arranged to rotate the gear wheel and the rotary shaft by means of the impact absorbing means.

2. The electric lock actuator according to claim 1, wherein said impact absorbing means includes a torsion coil spring.

3. The electric lock actuator according to claim 1, wherein:

said output shaft is formed in a substantially tubular manner, and said rotary shaft is inserted into the output shaft;

said cam mechanism has a first guide pin and a second guide pin, which are spaced apart from each other and provided on said rotary shaft, and a spiral guided portion arranged in said output shaft;

said output shaft is moved along said rotary shaft in a first direction when said guided portion is guided along both of said guide pins as the rotary shaft is rotated in the forward direction together with said gear wheel, and said output shaft is moved along said rotary shaft in a second direction opposite to the first direction when said guided portion is guided along both of said guide pins as the rotary shaft is rotated in the reverse direction together with the gear wheel.

4. The electric lock actuator according to claim 3, wherein said impact absorbing means includes a torsion coil spring.

5. The electric lock actuator according to claim 3, wherein:

said first and second guide pins each have an engaging surface;

said guided portion has a first end and a second end, said ends each including a first restricting surface and a second restricting surface;

said restricting means includes said engaging surface of both of said guide pins and both restricting surfaces of said guided portion; and rotation of said rotary shaft is restricted when said output shaft is moved in said first direction by engagement between the corresponding first restricting surface of the guided portion and said engaging surface of said first guide pin, and rotation of the rotary shaft is restricted when the output shaft is moved in said second direction by engagement between the corresponding second restricting surface of the guided portion and said engaging surface of said second guide pin.

6. The electric lock actuator according to claim 5, wherein said impact absorbing means includes a torsion coil spring.

7. The electric lock actuator according to claim 1, wherein:

said gear wheel has an accommodating portion and an engaging portion therein;

a portion of said rotary shaft including an engaging portion is arranged in said accommodating portion; and said impact absorbing means is accommodated in said accommodating portion, the impact absorbing means being constructed and arranged to enable engagement between said engaging portion of said gear wheel and said engaging portion of said rotary shaft.

8. The electric lock actuator according to claim 5, wherein said impact absorbing means includes a torsion coil spring, said coil spring having a first end and a second end, said first end serving to engage said engaging portion of said gear wheel and said second end serving to engage said engaging portion of said rotary shaft.

9. An electric lock actuator comprising:

a main body case:

an electric motor having a drive shaft;

an output shaft partially projecting outward from said main body case for reciprocating linearly along its axial direction, said output shaft having an inner surface;

a rotating body partially inserted into the output shaft and rotated in forward and reverse directions by said drive shaft of said electric motor;

said rotating body having a first guide portion and a second guide portion;

said inner surface of said output shaft provided with a spiral guided portion;

said guided portion including a first end, a second end, a first guide surface, and a second guide surface, said first guide surface being spiral and being capable of contacting said first guide portion, said second guide surface being spiral and being capable of contacting said second guide portion, wherein said output shaft is moved along said rotary shaft in a first direction when both of said guide surfaces of the guided portion are guided along both of said guide portions as the rotary shaft is rotated in the forward direction, said output shaft being moved along said rotary shaft in a second direction opposite to the first direction when both of the guide surfaces of the guided portion are guided along both of the guide portions as the rotary shaft is rotated in the reverse direction;

a rotary shaft and a gear wheel included in the rotating body and arranged coaxially, said rotary shaft and said gear wheel being capable of relative rotation;

a pinion included in said electric motor being fixed to said drive shaft, said pinion being meshed with said gear wheel; and an impact absorbing means for absorbing an impact of transmission of drive force of said electric motor sent to said rotating body when the rotation of the rotating body is restricted, said impact absorbing means being provided in said gear wheel between the gear wheel and the rotary shaft.

10. The electric lock actuator according to claim 9, wherein said impact absorbing means includes a torsion coil spring.

* * * * *